July 11, 1950
S. I. HAYES ET AL
2,514,762
MAIN AND AUXILIARY CONTROL VALVE ARRANGEMENT
FOR GROUNDED AVIATION TRAINERS
Filed Jan. 2, 1948
6 Sheets-Sheet 1
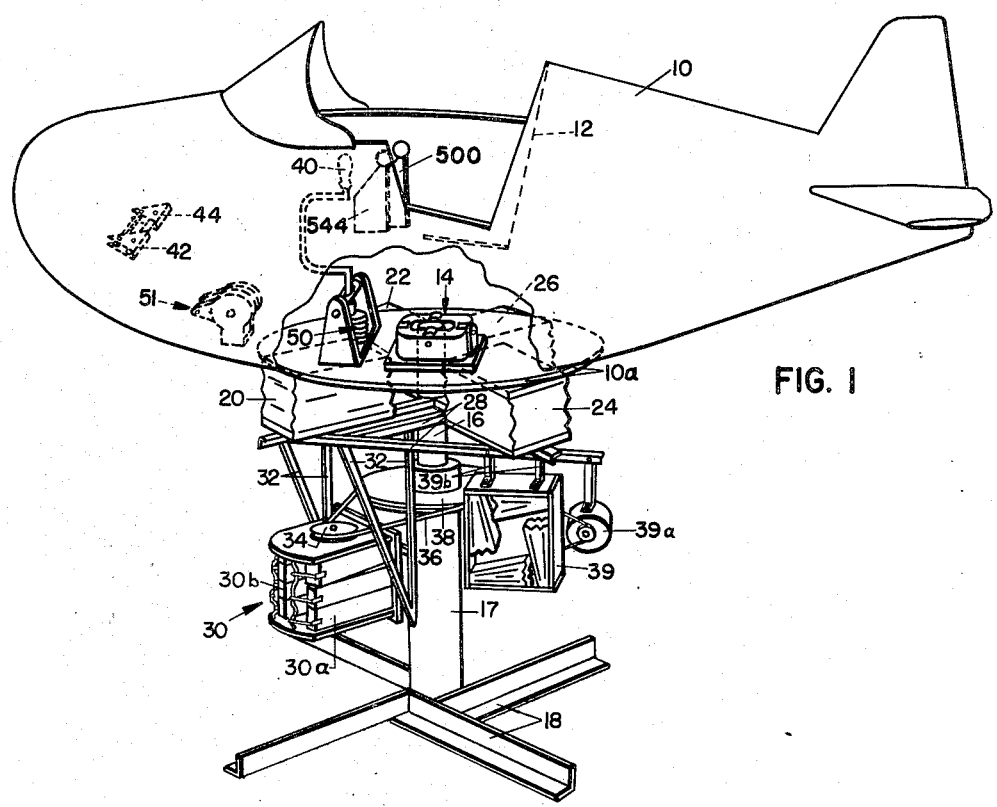
FIG. 1
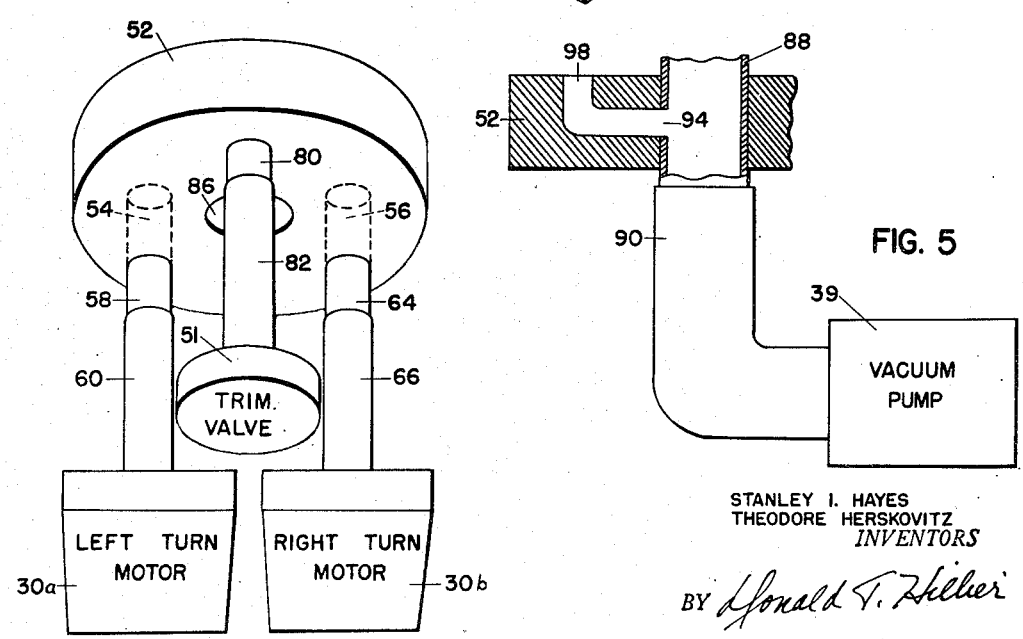
FIG. 4
FIG. 5
STANLEY I. HAYES
THEODORE HERSKOVITZ
INVENTORS
BY *Donald T. Hillier*
ATTORNEY

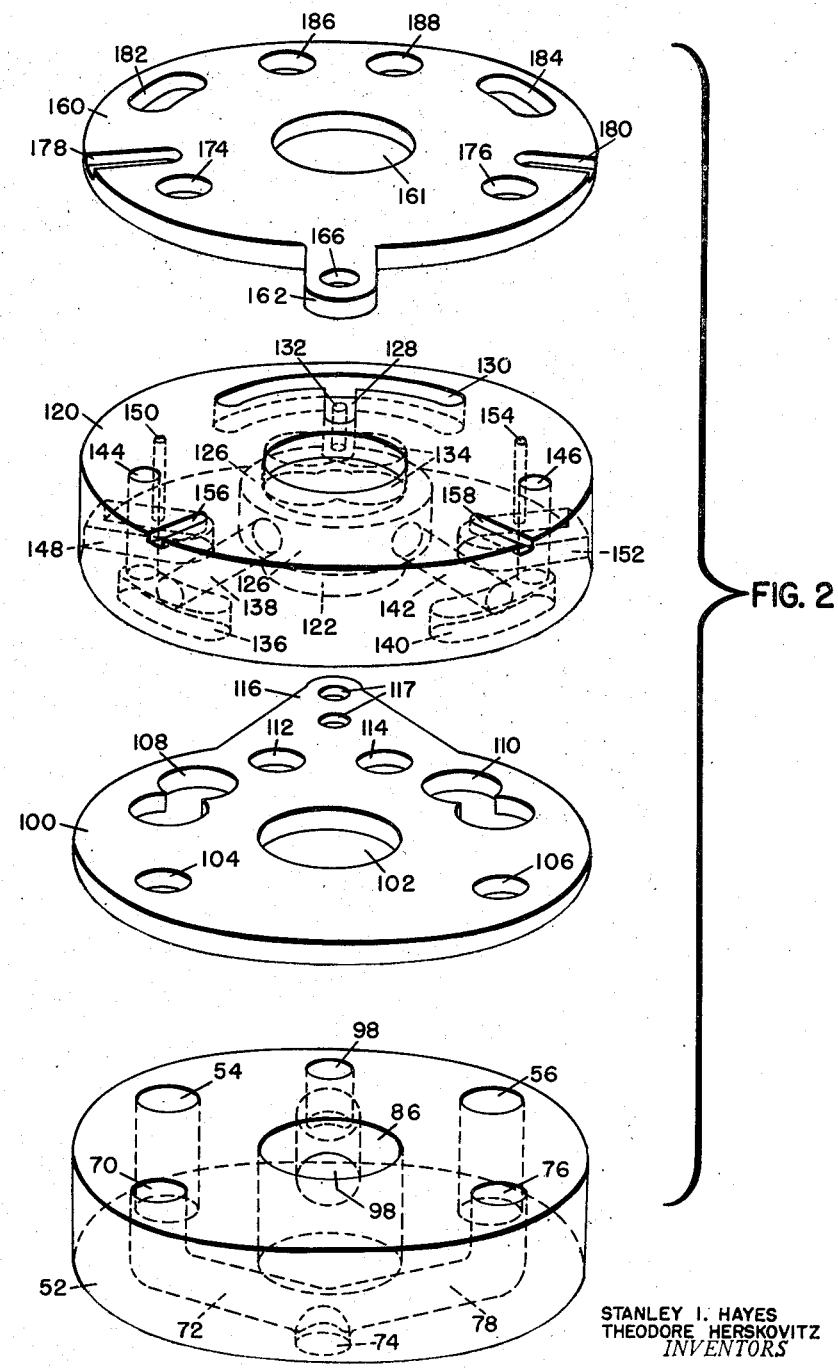

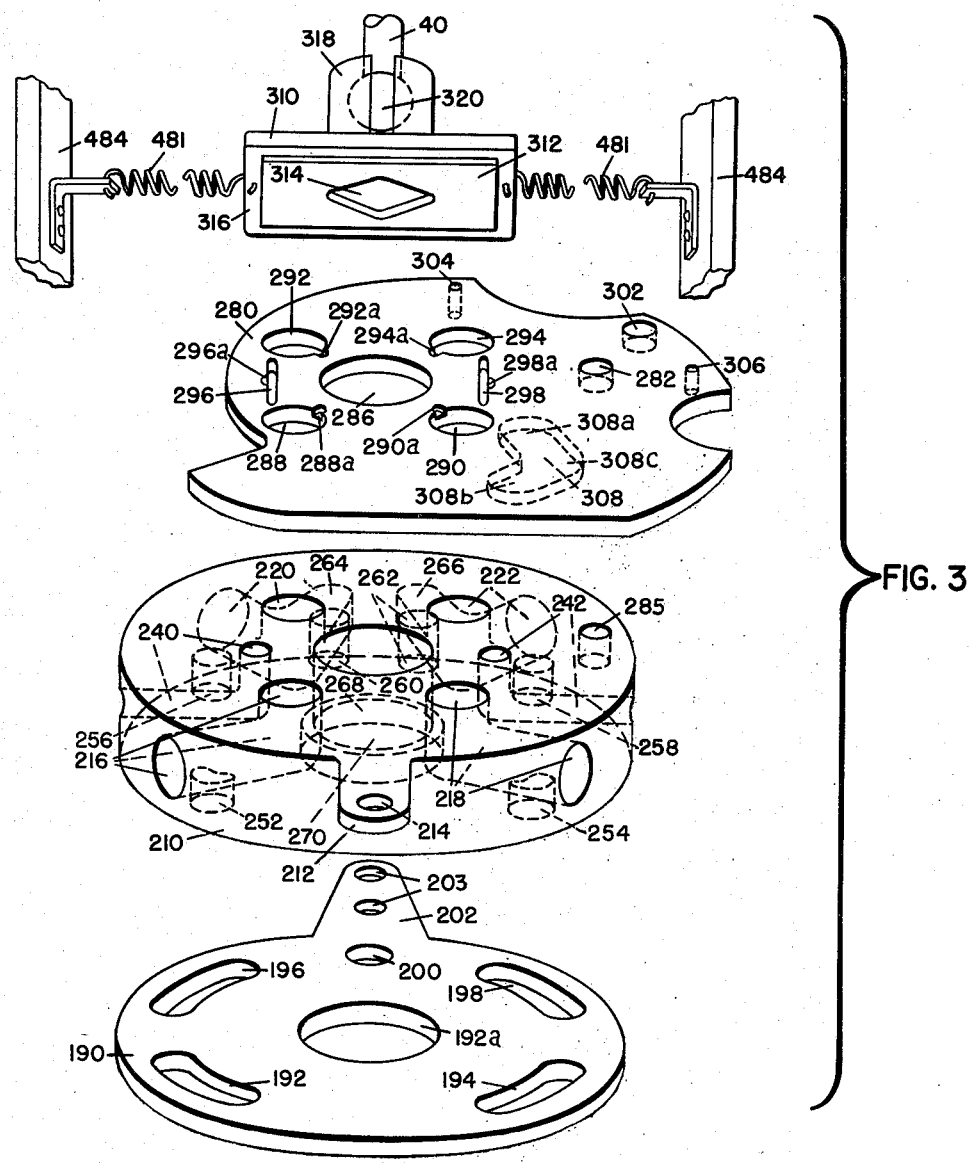

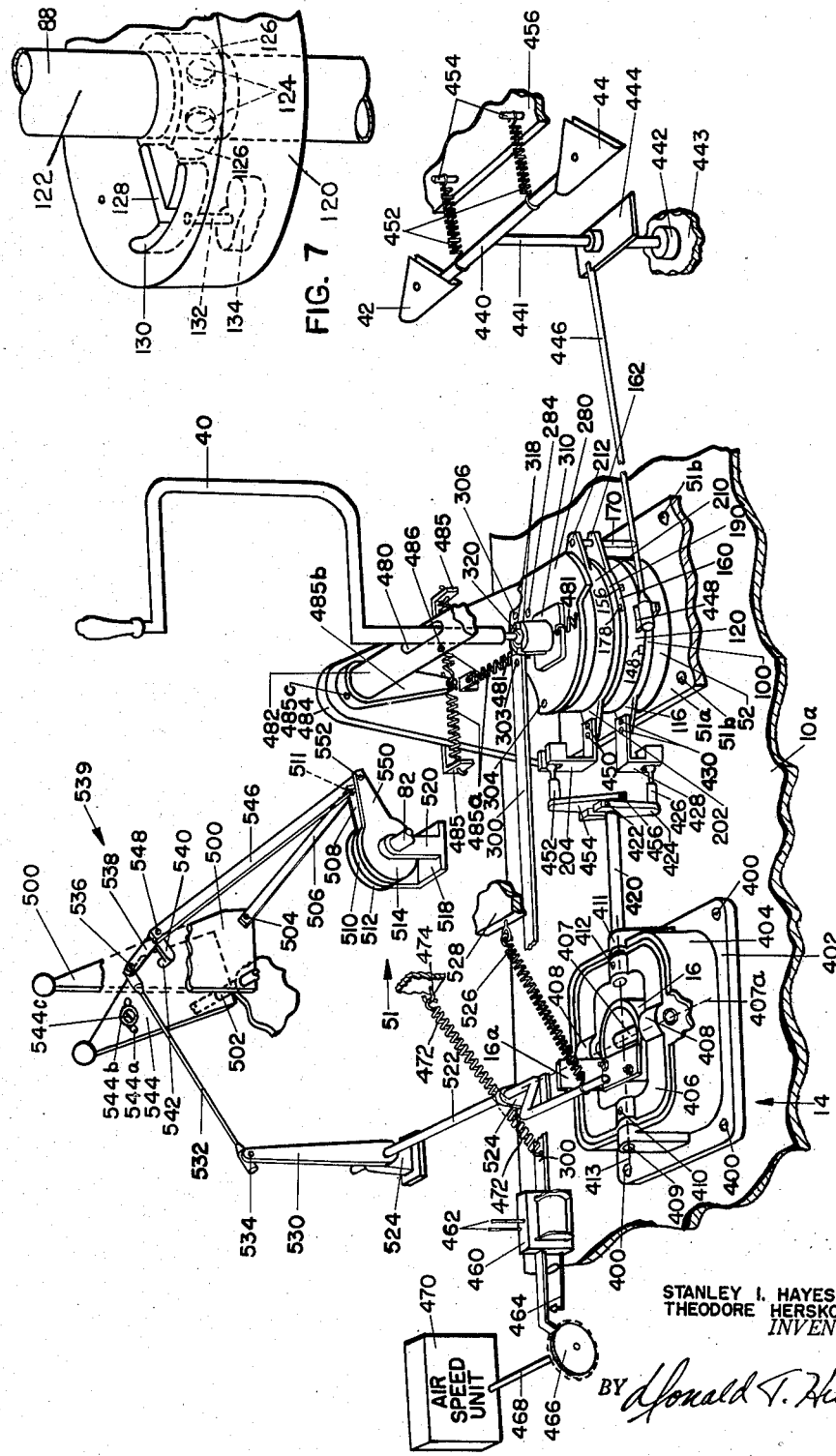

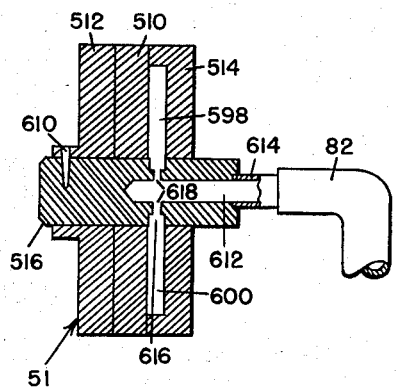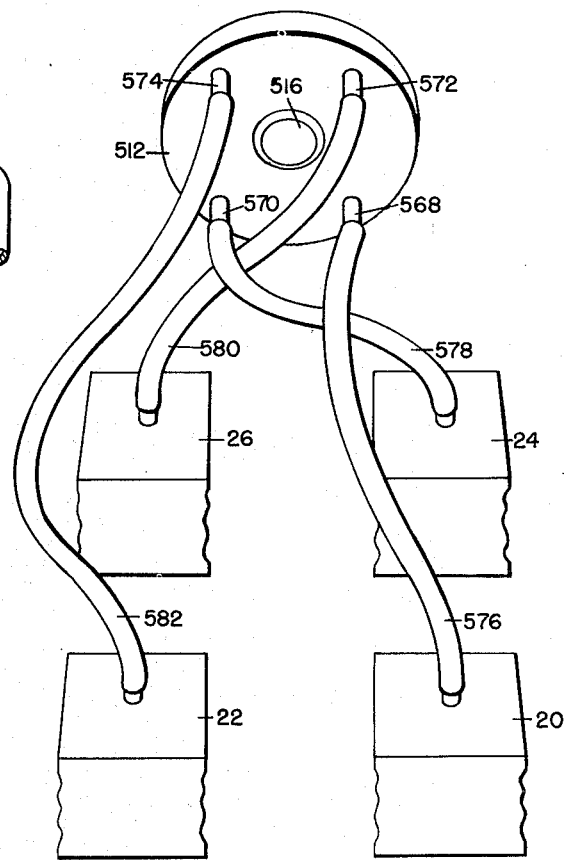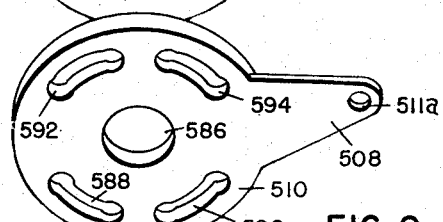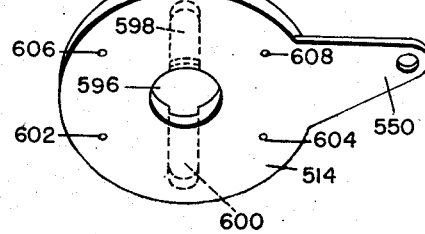

Patented July 11, 1950

2,514,762

UNITED STATES PATENT OFFICE

2,514,762

MAIN AND AUXILIARY CONTROL VALVE ARRANGEMENT FOR GROUNDED AVIATION TRAINERS

Stanley I. Hayes and Theodore Herskovits, Binghamton, N. Y., assignors to Link Aviation, Inc., Binghamton, N. Y., a corporation of New York Application January 2, 1948, Serial No. 328

6 Claims. (Cl. 35—12)

This invention relates to a main valve construction and auxiliary trim valve construction for use in conjunction with grounded aviation trainers of the type employing a fuselage universally and rotatably mounted with respect to a stationary base together with pneumatically operated means for producing pitching, banking and turning movements of the fuselage to simulate the turning, pitching and banking of a plane in actual flight. Such trainers are disclosed in United States Patents 1,825,462 and 2,099,857 issued to Edwin A. Link.

The copending application of Samuel Arthur Douglas, Serial Number 631,906, filed November 30, 1945, for Valve Construction for Grounded Aviation Trainers, which since the filing of this application has matured into Patent 2,469,918, dated May 10, 1949, discloses a main control valve for use in conjunction with trainers of the type just mentioned, the control valve comprising a series of five different valve sections all mounted upon the same vertical axis together with means for rotating certain of the sections in response to movements of the control stick and rudder pedals in the fuselage, and in response to banking movements of the fuselage in order to control the bellows and turning motor to cause the fuselage to turn, pitch and bank according to movements of the manually operable controls and of the fuselage.

The apparatus disclosed in this invention is in part an improvement upon the type of valve arrangement disclosed in Patent 2,469,918.

The valve arrangement disclosed in this application comprises eight sections including a lower fixed leaf, a leaf immediately thereabove for accomplishing the automatic turn with bank effect, and a rudder leaf positioned above the second mentioned leaf. The rudder leaf is connected to the rudder pedals in the trainer to be rotated in response to movements thereof, and the ports in the rudder leaf are arranged to be positioned relative to the ports in the second mentioned leaf and the ports in the second mentioned leaf are arranged to be positioned relative to the lowermost fixed leaf so that the operation of the turning motor is responsive to the relative rotational positions of the second mentioned leaf and the rudder leaf to produce turning of the fuselage according to the combined positions of the rudder pedals and banking position of the fuselage.

Above the rudder leaf is positioned a stationary leaf and above the stationary leaf is positioned a leaf which is operated by banking action of the fuselage. Above the last mentioned leaf is positioned a fixed leaf which has ports connecting to the main four bellows which control the pitching and banking movements of the fuselage. Ports are placed in the upper surface of the rudder leaf and in the other leaves between the rudder leaf and the leaf having connections to the bellows so that upon a rotation of the rudder leaf in response to rudder pedal action a banking of the fuselage automatically results. The ports in the leaf immediately below the fixed leaf having lines extending to the four bellows are arranged so that upon a rotation of the leaf in response to a banking of the fuselage the attitude bellows are selectively operated to produce a nosing down of the fuselage in response to a banking thereof.

Above the fixed leaf having the pneumatic lines running to the four bellows is provided a stall leaf which is pivotally mounted with respect to the just mentioned fixed leaf, and above the stall leaf is provided a vacuum cap which moves around with respect to the ports in the stall leaf to selectively apply vacuum to the ports in the stall leaf and to the ports in the fixed leaf immediately thereunder according to the position of the control stick which is connected to the vacuum cap to position the same. Consequently, movements of the control stick selectively apply vacuum and atmosphere to the pneumatic line running from the fixed leaf to the four main bellows to control the pitching and banking movements of the fuselage. The stall leaf in turn is connected to an actuating unit which is controlled by the air speed unit in the trainer so that when air speed drops to a predetermined amount, corresponding to the stalling air speed of the plane being simulated, the stall leaf is rotated upon the mentioned pivot to apply vacuum to the ports in the fixed leaf immediately therebelow connected to the front pitching bellows and to vent the ports in the same leaf connected to the rear pitching bellows to the atmosphere, to produce a sudden nosing down of the fuselage to simulate the stalling of a plane in actual flight.

Also, the fixed leaf having the pneumatic lines extending to the four main bellows has a pair of ports and pneumatic lines connected thereto which extend to the turning motor. The stall leaf has a pair of ports arranged above the two mentioned ports in the fixed leaf immediately therebelow so that upon movement of the vacuum cap in response to sidewise movements of the control stick vacuum and atmosphere are selectively admitted to the turning motor to turn the fuselage slightly in the opposite direction from which the fuselage is banked, thus simulating the aileron drag or adverse yaw effect experienced in actual flight.

An auxiliary trim valve is also provided by this invention, this trim valve having ports connected to the four main bellows, the various leaves of the trim valve being operated by the simulated throttle control lever and simulated elevator control lever in the trainer, as well as by the pitch action take-off mechanism, to control the pitch attitude of the fuselage in response to the combined settings of the throttle lever and trim lever and pitch attitude of the fuselage. The trim valve is supplied by vacuum from the previously described main valve and the supply of vacuum is responsive to the position of the movable leaf positioned above the lowermost fixed leaf of the main valve which in turn is responsive to the banking position of the fuselage to reduce the effect of throttle lever position, trim lever position and pitch attitude upon the pitch attitude of the fuselage as banking of the fuselage increases.

In order that the preferred embodiment of our invention may be clearly understood, reference is made to the accompanying drawings, wherein:

Fig. 1 is a side view of a trainer with which our invention may be employed, showing the general arrangement of the parts of this invention.

Fig. 2 is an exploded perspective view of the four bottom leaves of the main control valve of this application.

Fig. 3 is an exploded perspective view of the three top leaves of the main valve of this application, and of the vacuum cap and associated parts.

Fig. 4 is a bottom view of the lowermost stationary leaf of the main valve of this application, showing some of the fittings attached thereto and the pneumatic lines connected to the turning motors and trim valve.

Fig. 5 is a partial cross-sectional view of the lowermost fixed leaf of the main valve.

Fig. 6 is a perspective view showing the general relative positions and connections between the main parts of the apparatus of this invention.

Fig. 7 is a perspective view of a portion of the rudder leaf of the main valve.

Fig. 9 is an exploded detailed view of the leaves of the trim valve of this application.

Fig. 10 is a view showing the connections from the trim valve to the four main bellows, and Fig. 11 is a cross-sectional view of the trim valve.

Figure 8:
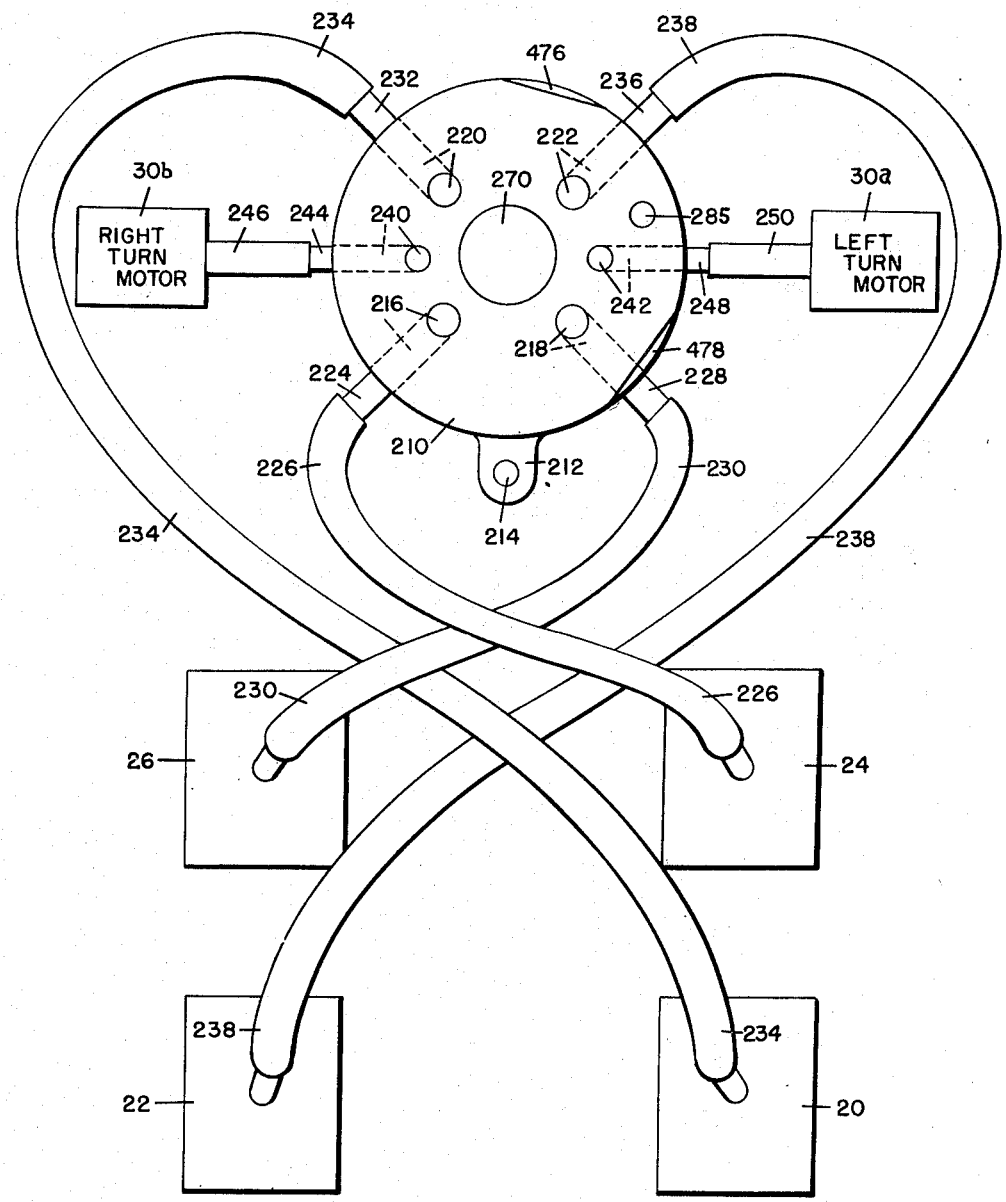
Fig. 8 is a top view of the main valve leaf which is connected to the four main bellows and turning motors, and also showing the connections, bellows and motors.

Reference is made to Fig. 1 where the fuselage 10 of the trainer is shown, in which is placed a seat 12 for the student using the trainer. The bottom of the fuselage is designated 10a and rests upon the universal joint designated generally by 14 which is supported by the vertical spindle 16 held by the bearing housing 17 which in turn is held by the stationary base 18. The left front bellows 20, the right front bellows 22, the left rear bellows 24 and the right rear bellows 26 are shown, each of these bellows having its lower end affixed to the framework 28 which is affixed to the vertical spindle 16 to rotate therewith, but inasmuch as the framework 28 is affixed to the spindle below the universal joint 14, it will be appreciated that the framework does not tilt. The turning motors which are designated generally by 30 and include left motor 30a and right motor 30b are supported by the arms 32 which are affixed to the framework 28, and the turning motors drive the output wheel 34 which by means of the belt 36 that wraps therearound as well as around the wheel 38 affixed upon spindle 16 rotates the fuselage 10 upon energization of the turning motor in response to the operation of the apparatus hereinafter disclosed. The pump for the supplying of vacuum is designated 39, and is driven by motor 39a, the pump and motor being affixed to framework 28 by arms 39b.

Placed ahead of the seat 12 in the trainer is the stick 40 which simulates the control stick of a real plane, and ahead of the control stick are the left and right rudder pedals 42 and 44.

It will be noted that unlike the prior art trainers, none of the four main bellows 20, 22, 24 or 26 is on the longitudinal or transverse axis of the fuselage 10, but that bellows 20 and 22 are ahead of the transverse axis and bellows 24 and 26 are to the rear of the transverse axis, while bellows 20 and 24 are to the left of the longitudinal axis and bellows 22 and 26 are to the right of the longitudinal axis. The upper end of each of the four bellows is connected to the bottom 10a of the fuselage.

Reference is now made to Fig. 2 where the lower sections of the improved main valve of this application which is designated generally by 50 is disclosed.

Considering now the detailed construction of the lowermost fixed leaf 52 of valve 50, this leaf has a pair of threaded taps (not shown) in its bottom for the reception of a pair of screws (not shown) which pass upwardly through the base plate 51a which is affixed to the bottom 10a of the fuselage by bolts 51b, as seen in Fig. 6, to hold leaf 52 stationary relative to the base plate. Leaf 52 has a pair of vertical ports 54 and 56 which extend completely through this leaf, and as seen in Fig. 4, a fitting 58 is inserted in the lower end of port 54 and is connected by the pneumatic line 60 which runs to the left turning motor 30a, while a fitting 64 is inserted in the lower end of port 56 and is connected by means of pneumatic line 66 with the right turning motor 30b. Referring back to Fig. 2, positioned counterclockwise of the port 54 is a port 70 which opens through the upper face of leaf 52 and is connected through the interior channel 72 with the port 74, which opens through the lower face of leaf 52. Positioned clockwise of the port 56 is port 76 which also opens through the upper face of leaf 52 and is connected through the interior channel 78 with port 74. As seen in Fig. 4, the fitting 80 is inserted in the port 74 and is connected through the pneumatic line 82 with the trim valve designated generally by 51.

In Fig. 2 it will be seen that the vertical central opening 86 of leaf 52 passes completely through the leaf, and as seen in Fig. 5, there is inserted therein tight fitting relation the central stem 88 which is connected by means of pneumatic line 90 to the pump 39 which provides a suitable source of reduced pressure or vacuum. The central stem 88 has an opening 94 which overlies the opening of port 98 into the central bore 86 of leaf 52. Port 98 runs horizontally within leaf 52 part way to the periphery thereof, and then extends vertically and opens through the upper face of leaf 52. Accordingly, the port 98 is at all times supplied with reduced pressure or vacuum.

In Fig. 2 the turn with bank leaf which lies on the base leaf 52 is numbered 100 and has a central opening 102 into which fits the central stem 88 and about which the leaf 100 rotates in response to banking action of the fuselage 10, as will be explained. Leaf 100 has a third pair of ports 104 and 106 which extend completely through this leaf, port 104 being arranged to exactly overlie port 70 in the leaf 52 when the fuselage 10 is in the level transverse or non-banking position, while port 106 exactly overlies port 76 in the leaf 52 under these same circumstances. A pair of figure-of-eight ports 108 and 110 also pass completely through leaf 100, these two ports being of sufficient size to overlie the ports 54 and 56, respectively, in leaf 52 throughout the entire range of rotation of the leaf 100. A third pair of ports 112 and 114 pass completely through the leaf 100, these two ports being arranged to lie upon opposite sides of the port 98 in leaf 52 when leaf 100 is centered, with no overlap between the ports. The leaf 100 has an integral arm 116 having two holes 117 therein, arm 116 also being shown in Fig. 6 to which reference is now made.

In Fig. 6, the bottom 10a of the fuselage 10 is shown and affixed to the bottom by bolts 400 is the universal joint base plate 402 integral with which is the upright square-shaped casting 404 which is the outer member of the universal joint 14. The inner gimbal of the universal joint is numbered 406 and is rotatably mounted about the transverse axis 407a by means of the rod 407 which passes through the upper end of the vertical spindle 16. Gimbal 406 has two integral bearing housings 408 containing bearings (not shown) held by the outer ends of the transverse rod 407 to permit pivoting of gimbal 406 about axis 407a. A first longitudinally extending shaft 409 has its rear end rotatably mounted in the upright 404 while its forward end is pinned to the inner gimbal 406 by means of pin 410. The shaft 420 which has its longitudinal axis aligned with the longitudinal axis of rod 409 is rotatably held by the upright 404 and the bearing housing 411 carried thereby, the rear end of rod 420 being pinned to the inner gimbal 406 by means of pin 412.

By virtue of this arrangement, it will be appreciated that when the fuselage 10 is pitched about the transverse axis 407a in response to an operation of the four bellows 20, 22, 24 and 26, the fuselage 10, bottom 10a, outer member 404 and inner gimbal 406 rotate about the transverse axis 407a. When fuselage 10 is banked in response to an operation of the same bellows, the fuselage 10, bottom 10a and outer universal joint member 404 rotate about the longitudinal axis 413 which is the axis of rods 420 and 409. It will be noted that the rod 420 does not rotate about axis 413 in response to a banking of fuselage 10.

Affixed upon the forward end of the fixed rod 420 by screws 422 is the bifurcated arm 424 integral with which is the stud 426 the outer end of which lies between the bifurcated lower end of arm 428, the upper end of which is affixed to the outer end of arm 116 integral with leaf 100 by bolts 430. When fuselage 10 banks to the left, the fixed rod 420 does not rotate and arm 424 remains vertically disposed, but the main valve 50 and section 100 move to the right of the axis 413, and by means of stud 426 and arm 116 the leaf 100 is rotated clockwise as seen from above through an angle proportional to the angle of bank. When fuselage 10 banks to the right, leaf 100 is rotated counterclockwise through an angle proportional to the angle of bank.

Considering now the detailed construction of the rudder leaf 120, a fragmentary perspective view of which is also shown in Fig. 7, to which figure reference is made in conjunction with Fig. 2, it will be seen that this leaf has a central opening 122 completely therethrough for the reception of the central stem 88 and that the periphery of central stem 88 intermediate the upper and lower faces of leaf 120 has a plurality of holes 124 which lead into the circular chamber 126 formed inside leaf 120 in order to supply the chamber 126 with vacuum at all times. A radially extending slot 128 is placed in the top of leaf 120, the inner end of this slot being connected with the chamber 126 and the outer end being connected with the arcuate slot 130 placed in the upper surface of leaf 120. A vertical port 132 of restricted capacity opens into the center of the arcuate slot 130 in the upper face of the leaf 120 and also opens into the figure-of-eight port 134 in the lower face of the rudder leaf 120. By virtue of this arrangement it will be appreciated that the arcuate slot 130 is supplied with vacuum at all times, and by means of port 132 the figure-of-eight port 134 in the bottom of leaf 120 is at all times supplied with vacuum, but the rate of exhaustion of port 134 is restricted by the size of port 132. The figure-of-eight port 134 is placed in the bottom center of leaf 120 so that it overlies the two ports 112 and 114 in the leaf 100 throughout the entire range of travel of leaves 100 and 120, and the counter-clockwise edge of port 134 is offset from the clockwise end of port 108 a few thousandths of an inch when leaves 120 and 100 are neutrally positioned, and the clockwise edge of port 134 is similarly displaced from the counter-clockwise edge of port 110 under the same circumstances.

The arcuate slot 136 is placed in the bottom of leaf 120 to overlie the port 104 in leaf 100 at all times, and slot 136 is connected by means of the interior channel 138 with the chamber 126 in the center of leaf 120. A second arcuate slot 140 is also placed in the bottom of leaf 120 to overlie port 106 of leaf 100 at all times, slot 140 being connected by means of interior channel 142 with the vacuum chamber 126. Consequently, slots 136 and 140 are supplied with vacuum at all times. The vertical port 144 opens through the upper face of the rudder leaf 120 and extends through to the vacuum filled slot 136 in the bottom of leaf 120, while the vertical port 146 also opens through the upper face of leaf 120 and extends through to the vacuum filled slot 140 in the bottom of leaf 120. A first radially extending slot 148 which opens through the periphery of leaf 120 is placed in the bottom of leaf 120 and is connected with the vertical port 150 which opens through the upper face of leaf 120, and a second radially extending slot 152 is placed in the bottom of leaf 120 and extends through to the periphery thereof, and is in communication with the vertical port 154 which opens through the upper face of leaf 120. It will be appreciated that ports 150 and 154 are open to the atmosphere at all times through slots 148 and 152, respectively. Slot 148 is positioned in leaf 120 so that its clockwise edge slightly overlaps the counterclockwise end of port 108 in leaf 100 when the two leaves are neutrally positioned, and slot 152 is positioned in leaf 120 so that its counterclockwise edge similarly overlaps the clockwise end of port 110 in leaf 100 under the same circumstances. Finally, a pair of radially extending slots 156 and 158 are placed in the upper surface of leaf 120 and these slots open through the periphery of the leaf.

Referring to Figs. 1 and 6, it will be seen that the left and right rudder pedals 42 and 44 are mounted upon the rudder bar 440 which is supported by the vertical post 441 rotatably held by a fixed bearing 442 attached to member 443 affixed in fuselage 10. The arm 444 is affixed upon post 441 to rotate therewith, and the forward end of the rudder link 446 is pivotally attached to arm 444 while the rear end of link 446 is pivotally attached to the bracket 448 which is suitably fixedly attached to the edge of the rudder leaf 120. A pair of centering springs 452 each has one of its ends attached to the rudder bar and its other end attached to one of the studs 454 carried by member 456 affixed to the interior of fuselage 10.

It will be appreciated that a forward displacement of left rudder pedal 42 from its neutral position rotates the rudder leaf 120 clockwise as seen from above from its neutral position through an angle dependent upon the magnitude of displacement of pedal 42 from its neutral position, and that a forward displacement of the right rudder pedal 44 from its neutral position rotates the leaf 120 counterclockwise of its neutral position through an angle dependent upon the magnitude of displacement of pedal 44 from its neutral position.

The stationary leaf which overlies the rudder leaf 120 is numbered 160 and is provided with an integral ear 162 having a hole 166 through which passes the retaining pin 170 shown in Fig. 6. The lower end of this retaining pin fits into a suitable hole in casting 51a. Leaf 160 has the central opening 161 through which the fixed stem 88 passes, and a first port 174 which passes completely therethrough, this port being positioned slightly counterclockwise of the vacuum port 144 in the rudder leaf 120 when the rudder leaf 120 is in its neutral position. A second port 176 also passes completely through leaf 160, this port being positioned slightly clockwise of the vacuum port 146 in the upper surface of the rudder leaf 120 when the rudder leaf is in its neutral position. The atmosphere slot 156 which is positioned in the upper surface of the rudder leaf 120 is positioned just counterclockwise of port 174 in leaf 160 when leaf 120 is neutrally positioned, while the atmosphere slot 158, also in the upper surface of leaf 120, is positioned just clockwise of port 176 in leaf 160 when the rudder leaf 120 is neutrally positioned. A slot 178 which extends radially of leaf 160 and opens through the periphery thereof is placed in the upper face of leaf 160, while a second slot 180 which also extends radially of leaf 160 and opens through the periphery thereof is also placed in the upper face of this leaf. A pair of kidney-shaped ports 182 and 184 pass completely through leaf 160, port 182 being arranged to lie slightly clockwise of the atmosphere port 150 in the upper surface of the rudder leaf 120 and slightly counterclockwise of the counterclockwise end of vacuum slot 130 in leaf 120 when the rudder leaf is neutrally positioned, and port 184 being positioned to lie slightly counterclockwise of the atmosphere port 154 in rudder leaf 120 and slightly clockwise of the clockwise end of vacuum slot 130 in leaf 120 when the rudder leaf is neutrally positioned. Finally, a pair of ports 186 and 188 pass completely through leaf 160 and are arranged to overlie the arcuate vacuum slot 130 in the upper surface of the rudder leaf 120 at all times.

Reference is now made to Fig. 3 where a detained disclosure of the other three leaves of the main control valve 50 are shown, the nose-down-with-bank leaf which overlies the fixed leaf 160 of Fig. 2 being numbered 190. This leaf has a central opening 192a for the reception of the central stem 88. The leaf 190 contains four kidney-shaped ports 192, 194, 196, and 198 which pass completely through the leaf, these four ports respectively overlying the ports 174, 176, 182, and 184 in the leaf 160 therebelow throughout the entire range of travel of leaf 190. Leaf 190 also contains an additional through port 200 which lies between the two ports 186 and 188 in the fixed leaf 160 when leaf 190 is in its neutral position. Leaf 190 has an integral ear 202 having a pair of holes 203 therethrough, and referring to Fig. 6 it will be seen that the arm 204 is connected to ear 202 by bolts 450 which pass through the previously described holes 203 in leaf 190. The upper end of arm 204 is bifurcated and between the forks thereof lies the stud 452 carried by the upper end of arm 454 which is affixed upon the fixed rod 420 by screws 456. By virtue of the just described interconnection between leaf 190 and the fixed rod 420, leaf 190 is rotated counterclockwise of its neutral position as seen from above in response to a banking of fuselage 10 to the left and clockwise of its neutral position in response to a banking of fuselage 10 to the right, the angular displacement of leaf 190 from its neutral position being proportional to the degree of bank of fuselage 10.

Positioned above the nose-down-with-bank leaf 190 is the fixed leaf 210 having an integral ear 212 having a hole 214 for the reception of the vertical retaining pin 170, as seen in Fig. 6. The four ports 216, 218, 220 and 222 open through the upper face of the fixed leaf 210, and each of these ports passes interiorly downward and then radially of leaf 210 to open through the periphery thereof. As shown in Fig. 8, the fitting 224 is placed in port 216 and is connected through the pneumatic line 226 to the left rear bellows 24; the fitting 228 is placed in the port 218 and is connected through pneumatic line 230 to the right rear bellows 26; the fitting 232 is placed in the port 220 and is connected through the pneumatic line 234 with the left front bellows 20; and the fitting 236 is placed in port 222 and is connected through the pneumatic line 238 with the right front bellows 22. As seen in Figs. 3 and 8, a pair of ports 240 and 242 open through the upper face of leaf 210 and extend downwardly and radially thereof in the interior of leaf 210 to open through the periphery of these leaves. A fitting 244 is inserted in the outer opening of port 240 and is connected by means of the pneumatic line 246 with the right turn motor 30b. Also, a fitting 248 is inserted in the outer opening of port 242 and is connected through the pneumatic line 250 with the left turning motor 30a.

Referring now to Fig. 3 only, four ports 252, 254, 256, and 258 open through the bottom face of the fixed leaf 210 and also into the ports 216, 218, 220, and 222 respectively. The ports 252, 254, 256, and 258 are positioned in the bottom of leaf 210 to overlie the through ports 192, 194, 196, and 198, respectively, in leaf 190 which is positioned below leaf 210 throughout the entire range of travel of leaf 190. Also placed in the lower face of the fixed leaf 210 are a pair of ports 260 and 262 which extend upwardly into the leaf to communicate with the channels 264 and 266, respectively, inside leaf 210, which channels in turn respectively communicate with the ports 220 and 222 in the leaf. Port 260 overlies leaf 190 just counterclockwise of port 200 in leaf 190 when leaf 190 is neutrally positioned, while port 262 is positioned to lie just clockwise of port 200 when leaf 190 is neutrally positioned. Finally, a shoulder 268 encircles the central opening 270 in leaf 210, this shoulder resting upon the upper end of the central stem 88.

The stall leaf 280 of Fig. 3 overlies the fixed leaf 210 and includes a pivot hole 282 through which fits the pivot 284 seen in Fig. 6 which passes through leaf 280 and is inserted in the hole 285 in the top of fixed leaf 210, as seen in Fig. 3. Leaf 280 also includes a central opening 286 which normally overlies the central opening 270 in the fixed leaf 210 and is therefore supplied with vacuum from the central stem 88. Placed around the central opening 286 are the four ports 288, 290, 292, and 294 which respectively overlie the upper openings of ports 216, 218, 220, and 222 in the upper face of leaf 210 when the stall leaf 280 is in its normal or counterclockwise position. The upper innermost edge of each of the ports 288, 290, 292, and 294 is notched at 288a, 290a, 292a, and 294a, respectively. A pair of slots 296 and 298 extend completely through the leaf 280 and are located as shown, and the outside edge of each of these slots is notched at 296a and 298a in the same fashion as the four through ports in the leaf 280. Slot 296 overlies the opening of port 240 in the upper face of the fixed leaf 210 and slot 298 overlies the opening of port 242 in the upper face of leaf 210 when the stall leaf 280 is in its normal or counterclockwise position, leaf 280 being shown in Fig. 3 in the normal position. A pair of stops 304 and 306, positioned as shown, depend from the stall leaf 280, and leaf 280 has the hole 302 in which fits the pivot 303 which connects the forward end of link 300 to leaf 280, as seen in Fig. 6 to which reference is made. The rear end of link 300 is connected to the solenoid 460 which is supplied by power through conductors 462, switch 464 being in series with the interior coil (not shown) of this solenoid. The cam 466 is mounted upon the shaft 468 which is positioned by the air speed unit 470 shown in box form according to the instant assumed air speed of the trainer, and cam 466 has a peripheral pattern and is arranged so that when the assumed air speed of the trainer is above the assumed stalling speed, switch 464 is closed, solenoid 460 is energized, and link 300 is in its normal or counterclockwise position, as shown in Fig. 6, so that the stall leaf 280 is in its counterclockwise position above leaf 210, link 300 being so positioned against the tension of spring 472 which has one end attached to link 300 and the other to fixed member 474. When solenoid 460 is so energized, link 300 moves to the rear rotating the stall leaf 280 counterclockwise until stop 304 engages the machined surface 476 on leaf 210, as shown in Fig. 8, and the ports in leaf 280 overlie the ports in leaf 210 as described. However, when assumed air speed is at or below the stalling speed, shaft 468 positions cam 466 so that switch 464 is open, solenoid 460 is de-energized, and spring 472 moves link 300 ahead until the stall leaf 280 is rotated clockwise until stop 306 engages the second machined surface 478 on leaf 210 in Fig. 8. As seen in Fig. 3, placed in the lower surface of leaf 280 is the L-shaped counterbore 308 which does not overlie any of the ports in the upper face of leaf 210 when the stall leaf 280 is in its normal or counterclockwise position, but which when the stall leaf 280 is in its clockwise position is positioned so that the end 308b of the counterbore overlies the port 220 in the upper surface of the fixed leaf 210 while the end 308a thereof overlies the port 222 in the upper face of leaf 210 and the corner 308c thereof overlies the vacuum filled central opening 270 of leaf 210. Ports 216 and 218 in leaf 210 are at the same time vented to the atmosphere by the rotation of the stall leaf which uncovers the ports.

In Fig. 3 it will be seen that the cap 310 rests upon the upper surface of the stall leaf 280 and includes a flat surface 312 out of which is cut a diamond-shaped counterbore 314 having slightly rounded corners. The raised lip 316 encircles the flat surface 312 which engages the upper surface of stall leaf 280, and integral with the upper portion of the cap 310 are the fingers 318 which engage the ball 320 attached to the lower end of the control stick 40, as seen in Fig. 6 to which reference is made. The control stick 40 passes through slot 480 in shaft 482 which is rotatably held in brackets 484 (only one shown in Fig. 6) integral with base plate 51a. A pin 486 pivots the stick 40 relative to shaft 482 to allow transverse movement of the stick. A pair of springs 481 are provided as seen in Fig. 3, each with one end connected to the cap 310 and its other end to one of the brackets 484 to center cap 310 on leaf 280 when the stick 40 is released. Also, as seen in Fig. 6, the bracket 484 carries a pair of fixed smaller brackets 485 to each of which is affixed one end of one of the pair of springs 485a the other end of each of which is affixed to the arm 485b affixed upon shaft 482 by set screw 485c. This spring arrangement centers the cap 310 above leaf 280 in the fore-and-aft direction when stick 40 is released. When the control stick 40 is in its neutral position and the fuselage 10 is in the level longitudinal and transverse position, and the stall leaf 280 is in its normal or counterclockwise position, the vacuum cap 310 will be positioned relative to the stall leaf 280 so that the flat surface 312 thereof completely covers the ports 288, 290, 292, 294, 296, 296a, 298 and 298a, the outer edges of the flat surface 312 being displaced from the outer edges of these ports by a few thousandths of an inch. The four sides of the diamond-shaped cut out portion 314 overlap the notches 288a, 290a, 292a, and 294a to supply a limited but equal amount of vacuum to the four ports in the upper surface of leaf 210 which are connected to the four main bellows, in order to provide stability to the fuselage 10.

Reference is now made to Fig. 6 where the simulated throttle control lever is designated by 500 and is rotatably mounted upon the transversely extending shaft 502 which may be suitably affixed within the fuselage 10. The position of lever 500 is also indicated in Fig. 1. Pivotally attached to the bottom of the lever 500 by means of pivot 504 is the upper end of link 506 to the lower end of which is attached the arm 508 integral with valve leaf 510 of the trim valve designated generally by 51, the lower end of link 506 being attached to arm 508 by pivot 511. The outside fixed leaf of valve 51 is numbered 512 and the inner movable leaf is numbered 514, all three of the leaves of this valve being mounted upon the horizontal rod 516 carried by the brackets 518 and 520.

It will be appreciated that when the simulated throttle control lever 500 is moved ahead to simulate the opening of the throttle of a real plane, the middle leaf 510 of valve 51 is rotated clockwise as seen in Fig. 6, and that when lever 500 is moved in the opposite direction to simulate the closing of the throttle of a real plane the leaf 510 is rotated counterclockwise. The position of leaf 510 is at all times dependent upon the position of the simulated throttle control lever 500, and the position of this lever may be taken as a measure of the instant assumed power available.

Still referring to Fig. 6, it will be seen that there is formed integrally with the upper end of the vertical spindle 16 the upwardly extending projection 16a against the rear edge of which bears one end of the crank 522 which is rotatably mounted in the brackets 524 affixed to the bottom 10a of the fuselage, a spring 526 having one end affixed to crank 522 and its other end to the fixed member 528 in order to hold the crank 522 against the rear edge of projection 16a at all times. Affixed upon the other end of crank 522 is the arm 530 to the upper end of which is pivoted the rear end of link 532 by means of pivot 534. The upper end of link 532 is attached by pivot 536 to the upper arm 538 of the bellcrank designated generally by 539. The second arm of this bellcrank is numbered 540 and is carried by the pivot 542 which in turn is carried by the simulated elevator trim lever 544 which in turn is rotatably mounted upon the previously described fixed rod 502. A slot 544a is placed in lever 544 and a suitable friction washer 544b is held against lever 544 by screw 544c, which passes through slot 544a and is held by a suitable fixed part inside the fuselage, to prevent movements of lever 544 except by the application of manual force. The upper end of link 546 is pivoted to bellcrank 539 by pivot 548, and the lower end of link 546 is pivoted to the arm 550 integral with leaf 514 of valve 51 by means of pivot 552.

Inasmuch as the axis of the lower portion of crank 522 is coincident with the transverse axis 407a, when the nose of fuselage 10 is lowered by an operation of the main control bellows 20, 22, 24 and 26, the coaction of crank 522 with the projection 16a of the vertical spindle 16 maintains the arm 530 in a vertical position at all times. Pivot 534 carried by the upper end of arm 530 does not move, but the pivot 542 will rotate clockwise about the transverse axis 407a and away from the pivot 534. The movement of pivot 542 away from pivot 534 causes link 532 to rotate bellcrank 539 counterclockwise, and link 546 will move upwardly rotating the leaf 514 counterclockwise. On the other hand, when the nose of fuselage 10 is raised the pivot 542 moves counterclockwise and closer to pivot 534, bellcrank 539 is rotated clockwise and the leaf 514 is rotated in the clockwise direction.

When the trim control 544 is moved ahead to simulate the trimming of the elevators of the plane represented by the trainer to produce a more nose-down attitude, the rotation of the lever 544 results in a clockwise movement of pivot 542 about shaft 502, and link 546 is moved downwardly to rotate leaf 514 clockwise. On the other hand, when the simulated elevator trim control lever 544 is moved to the rear to simulate the trimming of the elevators of the plane represented by the trainer to produce a more nose-up attitude, the pivot 542 carried by leaf 544 will be rotated counterclockwise and link 546 moves upwardly rotating leaf 514 counterclockwise.

Consequently, leaf 514 is at all times rotatably positioned about the axis of rod 516 in accordance with the combined position of fuselage 10 about the transverse axis 507a and the position of the simulated control lever 544. Driving of fuselage 10 and rearward movements of lever 544 produce counterclockwise motions of leaf 514, while raising the nose of fuselage 10 and forward movements of lever 544 result in clockwise motions of leaf 514.

Reference is now made to Fig. 9 which is a detailed plan view of the leaves 510, 512 and 514 of the trim valve 51, and to Figs. 4 and 10 which show the connections from the trim valve to the four main bellows and main valve 50. It will be seen that the leaf 512 has four ports 560, 562, 564 and 566 which extend completely therethrough, and as shown in Fig. 10 there are inserted in ports 560, 562, 564 and 566 the respective couplings 568, 570, 572 and 574 which are respectively connected through the pneumatic lines 576, 578, 580 and 582 to the respective bellows 24, 20, 26 and 22. The center of leaf 512 is drilled at 584 for the reception of the rod 516 shown in Fig. 11 upon which all of the leaves of valve 51 are mounted.

The middle leaf 510 of valve 51 is drilled in the center 586 for the reception of the rod 516, and this leaf has four kidney-shaped ports 588, 590, 592 and 594 which pass completely through the leaf and are arranged to overlie the ports 560, 562, 564 and 566 respectively in leaf 512 throughout the entire range of travel of leaf 510. The arm 508 integral with leaf 510 has a hole 511a therein for the reception of the pivot 511 shown in Fig. 6.

The leaf 514 is drilled in the center at 596 for the reception of the rod 516 shown in Fig. 11, and placed in the inner surface of this leaf are the two channels 598 and 600 which open into the center 596 and extend radially of the leaf to near the periphery thereof. The center lines of these two channels are 180° apart and channel 598 is arranged to lie intermediate the two ports 592 and 594 in leaf 510 when the leaves are neutrally positioned with respect to one another to provide a slight vacuum leak into ports 592 and 594. Similarly, channel 600 is arranged to lie between the ports 588 and 590 in leaf 510 when the leaves are neutrally positioned with respect to one another to provide a slight vacuum leak into ports 588 and 590. The four atmosphere ports 602, 604, 606 and 608 pass completely through leaf 514, port 602 being arranged to lie slightly clockwise of port 588, port 604 being arranged to lie slightly counterclockwise of port 590, port 606 being arranged to lie slightly counterclockwise of port 592 and port 608 being arranged to lie slightly clockwise of port 594 when leaves 510 and 514 are neutrally positioned with respect to one another.

Reference is now made to Fig. 11 where it will be seen that the fixed leaf 512 is affixed upon the fixed rod 516 by means of set screw 610, and that leaves 510 and 514 are freely mounted upon the rod 516. The outer end of rod 516 is drilled at 612 and the coupling 614 is inserted in the outer end of the drilled portion and is connected through the pneumatic line 82 to the coupling 80 shown in Fig. 4 and inserted in port 74 in the bottom leaf 52 of the main valve. The diameter of rod 516 is turned down at 616 and a plurality of radially extending ports 618 connect the center bore 612 in rod 516 with the turned down circumference 616 of rod 516. The two channels 598 and 600 in leaf 514 communicate with the turned down portion 616 of rod 516 at all times.

*Operation*

*Turning action.*—Assuming that the rudder pedals 42 and 44 are in their neutral positions, that the stick 40 is in its neutral position, and that the fuselage 10 is in the level transverse or non-cranking position, the various leaves of the main valve 50 will all be in their neutral rotational positions, and the fuselage 10 will be in a stationary position. Assuming that the left rudder pedal 42 is pressed ahead, through the previously described mechanism interconnecting the rudder pedals and the rudder leaf 120 of valve 50, the leaf 120 will be rotated counterclockwise as seen in Fig. 2 through an angle proportional to the magnitude of displacement of the left rudder pedal 42 from its neutral position. The figure-of-eight counterbore 134 in the bottom of leaf 120 will be moved into a position overlapping the port 108 by an amount dependent upon the displacement of leaf 120 from its neutral position. The limited supply of vacuum fed into the figure-of-eight counterbore 134 through the restricted port 132 in leaf 120 will pass through the port 108 in leaf 100 into port 54 in leaf 52 and by means of fitting 58 and pneumatic line 60 of Fig. 4 will be introduced into the left turning motor 30a. Simultaneously, the atmosphere slot 152 in the bottom of leaf 120 will be moved into a greater overlapping position with respect to the port 110 in leaf 100, the amount of the overlap being dependent upon the magnitude of forward displacement of the left rudder pedal 42. Atmosphere will accordingly pass through the port 110 and through port 56 in the bottom leaf 52 and will be carried by the fitting 64 and pneumatic line 66 to the right turning motor 30b. The admission of vacuum to the left turning motor and of atmosphere to the right turning motor will energize the turning motors to rotate the output wheel 34 which by means of belt 36 and spindle 38 will produce a rotation of the fuselage 10 to the left. The rate of rotation will be dependent upon the magnitude of displacement of the left rudder pedal 42 from its neutral position, and in any event will be relatively slow because of the limited amount of vacuum in the figure-of-eight counterbore 134. This limitation of the rate of turning of the fuselage 10 in response to a movement ahead of the left rudder pedal 42, in the absence of a banking of the fuselage 10, simulates the relatively slow turning of a plane in actual flight in response to rudder pedal action only.

On the other hand, assuming the same general circumstances except that the right rudder pedal 44 is moved ahead instead of the left rudder pedal 42, the rudder leaf 120 will be rotated clockwise from its neutral position and the limited supply of vacuum in the figure-of-eight counterbore 134 will pass through the port 110 because the figure-of-eight counterbore 134 will overlie port 110 by an amount dependent upon the displacement of the right rudder pedal 44. Communication will be made with the right turning motor 30b through the port 56 in leaf 52 and through the fitting 64 and pneumatic line 66. Simultaneously, the atmosphere slot 148 in the bottom of leaf 120 will be rotated into a position overlying the port 108 in leaf 100 to a greater extent, the amount of increased overlap also being dependent upon the forward displacement of the right rudder pedal 44. Atmosphere will be carried to the left turning motor 30a through the port 54 in leaf 52 and through fitting 58 and pneumatic line 60. The admission of vacuum to the right turning motor 30b and of atmosphere to the left turning motor 30a will result in an energization of the turning motors in the opposite direction from that previously described to produce a turning of the fuselage 10 to the right. The rate of turn will be dependent upon the magnitude of displacement of the right rudder pedal 44, and, for the same reason as previously explained, will be relatively slow because of the limited amount of vacuum available in the figure-of-eight counterbore 134.

*Turn with bank.*—Assuming that the manually operated controls and fuselage 10 as well as the leaves of valve 50 are all neutralized, and that the fuselage 10 is then banked to the left, as will be later more fully described, the leaf 100 of valve 50 will be rotated clockwise through an angle proportional to the degree of bank. The port 112 will be brought into an overlapping position with respect to the vacuum port 98 in the upper surface of the leaf 52, admitting an increased supply of vacuum into the counterbore 134 in the bottom of leaf 120. At the same time, the port 108 will be brought into an underlapping position with respect to counterbore 134 and the increased supply of vacuum in counterbore 134 will pass through port 108, port 54 in leaf 52, fitting 58 and pneumatic line 60 to the left turning motor 30a. Simultaneously, the port 110 in leaf 100 will be brought into an increased underlapping position with respect to the atmosphere slot 152 in the bottom of leaf 120, and an increased supply of atmosphere will pass through port 110, port 56, fitting 64 and pneumatic line 66 to the right turning motor 30b. It will be appreciated that the amount of vacuum admitted to the left turning motor 30a and the amount of atmosphere admitted to the right turning motor 30b will be dependent upon the magnitude of displacement of the leaf 100 from its neutral position which in turn is dependent upon the degree of bank of the fuselage 10 to the left. The admission of vacuum to the left turning motor 30a and of increased atmosphere to the right turning motor 30b will result in an energization of the turning motors to cause the fuselage 10 to rotate to the left. In view of the fact that the supply of vacuum in the port 98 of leaf 52 is of greater exhausting capacity than the supply of vacuum in port 134 which is admitted thereto through the restricted port 132, it will be appreciated that the rate of rotation of the fuselage 10 to the left in response to a banking to the left of the fuselage may be considerably greater than the rate of rotation of the fuselage to the left produced only by a forward movement of the left rudder pedal 42.

On the other hand, assuming the same circumstances with the exception that the fuselage 10 is banked to the right instead of to the left, the leaf 100 will be rotated counterclockwise of its neutral position and port 114 in that leaf will be moved into an overlapping position with respect to the vacuum port 98 in leaf 52. At the same time, the port 110 in leaf 100 will be brought into underlapping position with respect to the counterbore 134 in the rudder leaf 120, and the increased supply of vacuum admitted into the counterbore 134 in the rudder leaf will be communicated through ports 110 and 156, fitting 64 and pneumatic line 66 to the right turning motor 30b. Simultaneously, the port 108 will be moved into an increased underlapping position with respect to the atmosphere slot 148 in the bottom of leaf 120, and increased atmosphere will be passed through the port 108, port 54, fitting 58 and pneumatic line 60 to the left turning motor 30a. The admission of vacuum to the right turning motor 30b and of increased atmosphere to the left turning motor 30a will result in an energization of the turning motor to rotate the fuselage 10 to the right. It will be appreciated that the rate of turning to the right will depend upon the magnitude of displacement of the leaf 100 from its neutral position, which in turn depends upon the degree of bank of fuselage 10 to the right, and that the rate of rotation may be considerably greater than the rotation achieved by the pressing forward of the right rudder pedal alone because the supply of vacuum to the port 98 in the top of leaf 52 is, as previously explained, of greater exhausting capacity than that fed into counterbore 134 through port 132.

It will be noted that the rudder leaf 120 is rotated counterclockwise in response to a forward movement of the left rudder pedal 42 to produce a turning to the left of fuselage 10, while leaf 100 is rotated clockwise in response to a banking to the left of fuselage 10. At the same time, leaf 120 is rotated clockwise in response to a forward movement of the right rudder pedal 44, while leaf 100 is rotated counterclockwise in response to a banking to the right of the fuselage. Rotation of the rudder leaf 120 in one direction brings the ports and channels in the bottom of that leaf into the same position with respect to the ports in leaf 100 as does a rotation of leaf 100 in the opposite direction. Consequently, when the left rudder pedal 42 is moved ahead to rotate leaf 120 counterclockwise to produce a relatively slow turning to the left of fuselage 10, and then the fuselage is banked to the left at the same time, as should be done to simulate the correct handling of a plane in actual flight when a turn to the left is being made, the banking action of the fuselage rotates leaf 100 clockwise to produce a much more rapid rotation of the fuselage 10 to the left than could be accomplished by rudder pedal action only. When the right rudder pedal 44 is pressed ahead to rotate leaf 120 clockwise to slowly turn the trainer to the right, and then the fuselage is banked to the right, as should be the case, a counterclockwise rotation of leaf 100 occurs, and the rotation of the fuselage 10 to the right is greatly increased—simulating the corresponding responses of a plane in actual flight under corresponding actual circumstances.

It will be noted that the turning of the fuselage 10 in one direction as a result of a displacement of one of the rudder pedals may be lessened, offset, or even reversed by banking the fuselage 10 in the opposite direction by varying amounts.

*Effect of bank on trim.*—It will be noted that as the fuselage 10 is banked to the left or right, the port 104 is moved out of overlapping position with respect to the port 70 in the leaf 52 and the port 106 is moved out of overlapping position with respect to the port 76 in leaf 52 by an amount dependent upon the degree of bank of fuselage 10. Accordingly, the amount of vacuum fed from the slot 136 in the bottom of leaf 120 through port 104 to port 70 and then through channel 72, port 74, fitting 80 and pneumatic line 82 to the trim valve 51, shown in Fig. 4, will be decreased and the vacuum in channel 140 in the bottom of leaf 120 fed through port 106 in leaf 100 and port 76 in leaf 52 and through channel 78, port 74, fitting 80 and pneumatic line 82 to the valve 51 will also be decreased. Consequently, the supply of vacuum to the trim valve 51 is progressively reduced as the fuselage 10 is banked either to the left or right, and when fuselage 10 is banked to the extreme left or right all vacuum to the trim valve 51 is cut off.

*Bank with turn.*—Assuming the fuselage 10 to be in a simulated straight and level flight with the manually operable controls therein neutralized, and the leaves of the main control valve 50 also neutralized, and assuming that the rudder leaf 120 is rotated counterclockwise in response to a forward movement of the left rudder pedal 42 to produce a turning of the fuselage 10 to the left, the vacuum port 144 in the upper surface of the rudder leaf 120 will be moved into underlapping position with respect to the port 174 in the fixed leaf 160 and vacuum will pass through port 174, through the port 192 in leaf 190, and through port 152 into port 216 in leaf 210. From port 216 vacuum will be admitted to the left rear bellows 24 by means of fitting 224 and pneumatic line 226. Simultaneously, the left or counterclockwise end of the vacuum slot 130 in the upper surface of leaf 120 will move into underlapping relation with the port 182 in leaf 160, and vacuum will pass through port 182, port 196 in leaf 190, port 256 in the bottom of leaf 210, port 220 in leaf 210, and by means of fitting 232 and pneumatic line 234 will pass to the left front bellows 20. Simultaneously, the atmosphere slot 158 in the upper surface of leaf 120 will be moved into underlapping position with respect to port 176 in leaf 160, and atmosphere will pass through port 176, port 194 in leaf 190, and port 254 in the bottom of leaf 210 into the port 218 in the same leaf, and then by means of fitting 228, and pneumatic line 230 to the right rear bellows 26. Also simultaneously, the atmosphere port 154 in the upper surface of the rudder leaf 120 will move into underlapping position with respect to the port 184 in leaf 160, and atmosphere will pass through port 184, port 198 in leaf 190 and port 258 in leaf 210 into the port 222 in leaf 210, and then by means of fitting 236 and pneumatic line 238 to the right front bellows 22. Consequently, a turning of the fuselage 10 to the left results in an admission of vacuum into the left rear bellows 24 and left front bellows 20, and of atmosphere into the right rear bellows 26 and right front bellows 22. The two left bellows will be contracted and the two right bellows expanded, and a banking of the fuselage 10 to the left results. It will be appreciated that the degree of resultant bank will depend upon the volume of vacuum and atmosphere admitted into the bellows, which in turn will depend upon the magnitude of displacement of the leaf 120 from its neutral position. Accordingly, the degree of automatic banking of the fuselage to the left in response to a turning of the fuselage to the left will be proportional to the rate of turning of the fuselage attributable to the displacement of the rudder pedal from its neutral position.

Assuming that the rudder leaf 120 is rotated clockwise of its neutral position by a forward displacement of the right rudder pedal 44, the right end of the vacuum slot 130 in the upper surface of leaf 120 will be moved into underlapping position with respect to the port 184, and by means of the same described path interconnecting port 184 and the right front bellows 22, vacuum will be admitted into bellows 22; the vacuum port 146 in the upper surface of leaf 120 will be moved into underlapping position with respect to port 176 in leaf 160, and vacuum will pass from port 176 to the right rear bellows 26 through the previously described path; the atmosphere slot 156 in the upper surface of leaf 120 will be moved into underlapping position with respect to port 174 in leaf 160, and atmosphere will pass from port 174 through the previously described path to the left rear bellows 24; and the atmosphere port 150 in the upper surface of leaf 120 will be moved into underlapping position with respect to port 182 in leaf 160, and atmosphere will pass from port 182 through the previously described path to the left front bellows 20. Consequently, vacuum will be admitted to the two right bellows 22 and 26 while atmosphere will be admitted to the left bellows 20 and 24, producing a banking of the fuselage 10 to the right. The degree of bank will depend upon the volume of atmosphere and vacuum admitted to the four bellows, which volume depends upon the magnitude of forward displacement of the right rudder pedal 44.

*Nose down with bank.*—When the fuselage 10 is banked to the left, the leaf 190 is rotated counterclockwise through an angle proportional to the degree of bank. The port 200 in leaf 190 is moved into overlapping position with respect to the port 186 in leaf 160 which in turn overlies the vacuum slot 130 in the upper surface of leaf 120, and at the same time port 200 in leaf 190 moves into underlapping position with respect to the port 260 in the under surface of leaf 210. Vacuum will be passed from slot 130 through ports 186 and 200 into the port 260 in leaf 210 and thence through channel 264 in leaf 210 to port 220 and then through the previously described connection to the left front bellows 20. At the same time the port 194 will be moved into overlapping position with respect to the atmosphere slot 180 in the upper surface of leaf 160, and atmosphere will pass through ports 194 and 254 into port 218 in leaf 210, and thence through the previously described path to the right rear bellows 26. Consequently, a banking of the fuselage 10 to the left results in an admission of vacuum to the left front bellows 20 and of atmosphere to the right rear bellows 26, to produce an increased lowering of the front left corner of the fuselage and an increased raising of the right rear corner thereof, to simulate the automatic nosing down of a plane in actual flight as a result of a banking to the left thereof. As previously explained, the automatic banking to the left also produces an automatic turning to the left.

On the other hand, when the fuselage 10 is banked to the right the leaf 190 is rotated clockwise from its neutral position, and port 200 in leaf 190 is moved into overlapping position with respect to the port 188 in leaf 160, which last mentioned port overlies the vacuum slot 130 in the upper face of leaf 120. Consequently, vacuum is passed through port 200 to the port 262 in the lower face of the fixed leaf 210, and thence into channel 266 and port 222 in leaf 210, and then along the previously described path to the right front bellows 22. Simultaneously, the port 192 in leaf 190 is moved into overlapping position with respect to the atmosphere slot 178 in leaf 160, and atmosphere is passed through port 192 and port 252 in leaf 210 into port 216 in leaf 210. From port 216 atmosphere passes along the previously described path to the left rear bellows 24. Consequently, a banking of the fuselage to the right results in an admission of vacuum to the right front bellows 22 and of atmosphere to the left rear bellows 24, resulting in a further lowering of the right front corner of the fuselage and in a further raising of the left rear corner, thus simulating the automatic dropping of the nose of a plane banked to the right.

It will be appreciated that the magnitude of the nosing down of the fuselage 10 in response to the banking to the left or right thereof will be proportional to the degree of bank.

*Pitching and banking of the fuselage in response to control stick movement.*—Assuming that the student in the trainer moves the control stick 40 directly ahead, the stick will rotate the shaft 482 held by bracket 484, as seen in Fig. 6, and the lower end of the control stick and ball 320 will move to the rear. The rearward movement of this ball engages the fingers 318 integral with cap 310 and the cap is moved to the rear. The diamond-shaped cut out portion 314 seen in Fig. 3 will then be brought into overlapping position with respect to the ports 292 and 294 and increased vacuum will be applied from the central opening 286 in leaf 280 through the ports 292 and 294 and ports 220 and 222 in leaf 210 as well as through the previously described interconnecting elements to the two front pitching bellows 20 and 22. Simultaneously, the rearward movement of plate 212 will uncover the ports 288 and 290 in leaf 280, venting these ports to the atmosphere, and atmosphere will be passed through the ports 216 and 218 in leaf 210 to the left rear bellows 24 and right rear bellows 26. The admission of increased vacuum into the two front bellows and of atmosphere into the two rear bellows will result in a collapsing of the first pair of bellows and in an expansion of the second pair of bellows, and the nose of fuselage 10 will be lowered, thus simulating the lowering of the nose of a plane in actual flight in response to a forward movement of the control stick.

On the other hand, assuming that the student in the trainer moves the control stick 40 to the rear of its neutral position, the cap 310 will be moved ahead of its neutral position and increased vacuum will be applied to the two ports 288 and 290 while the ports 292 and 294 will be vented to the atmosphere. Through the previously described connections, increased vacuum will be admitted to the right rear bellows 26 and left rear bellows 24, while atmosphere will be admitted to the left front bellows 20 and right front bellows 22. The first pair of bellows will be contracted and the second pair will be expanded, resulting in a raising of the nose of fuselage 10, thus simulating the raising of the nose of a plane in actual flight as a result of a movement to the rear of the control stick.

With the control stick in its neutral position and the trainer fuselage 10 in the level longitudinal and transverse position, when the student in the trainer moves the stick 40 to the left, the vacuum cap 310 moves to the right of the fuselage, applying increased vacuum to the ports 288 and 292 and venting the ports 290 and 294 to the atmosphere. The left front bellows 20 and the left rear bellows 24 will be contracted while the right front bellows 22 and right rear bellows 26 will be expanded, resulting in a banking of the fuselage 10 to the left, simulating the banking of a pane in actual flight to the left in response to a movement to the left of the control stick. It will be appreciated that a movement of the control stick 40 to the right will result in an application of increased vacuum to the right front bellows 22 and right rear bellows 26 and of atmosphere to the left front bellows 20 and left rear bellows 24, producing a banking of fuselage 10 to the right, simulating the banking of a plane in actual flight to the right in response to a movement to the right of the control stick.

Movements of the control stick 40 in any direction other than straight fore and aft or directly sidewise results in applying increased vacuum to or venting the four main ports in the stall leaf 280 to produce the proper combination of expansion and contraction of the four main bellows to give motions of the fuselage 10 about its transverse and longitudinal axes to simulate the motion of a real plane about its two corresponding axes in response to corresponding movements of the stick in the plane.

*Aileron drag effect.*—When the control stick 40 is moved to the left of its neutral position, the vacuum cap 310 moves to the right, first venting the notch 298a to the atmosphere and then venting the port 298 to atmosphere, and permitting atmosphere to pass through port 298 in leaf 280 and port 242 in leaf 210 and by means of fitting 248 and pneumatic line 250 to the left turning motor 30a. At the same time, the cut-out portion 314 in cap 310 is moved into overlapping position with respect to port 296 in leaf 280, and vacuum is applied through port 296 in leaf 280 and through port 240 in leaf 210, as well as through fitting 244 and pneumatic line 246 to the right turning motor 30b. The admission of atmosphere to the left turning motor 30b and of vacuum to the right turning motor produces a slight turning to the right of fuselage 10, thus simulating the aileron drag effect of a plane in actual flight which causes the plane to first turn slightly to the right in response to a left movement of the stick control. However, as the actual banking of fuselage 10 to the left commences, as previously explained the leaf 100 will be rotated clockwise to admit vacuum to the left bellows 20 and 24, and a larger volume of vacuum to the left turning motor 30a and of atmosphere to the right turning motor 30b, and a turning to the left of the fuselage will be produced.

On the other hand, when the control stick 40 is moved to the right the resulting movement to the left of the vacuum cap 310 results in a venting of the notch 296a and port 296 to the atmosphere, and in an application of vacuum to the port 298. Atmosphere is applied to the right turning motor 30b and vacuum to the left turning motor 30a, and the fuselage initially turns to the left, simulating the initial turning to the left of a plane in actual flight in response to a movement to the right of the control stick. However, as the bank to the right commences, as previously explained, the automatic turn with bank effect will overcome the initial adverse turning effect, and the turn of fuselage 10 will be reversed and to the right.

*Stall effect.*—When the stall leaf 280 is rotated into its clockwise position as previously explained in the presence of an air speed at or below the assumed stalling air speed, the stop 306 engages the machined surface 478 on valve section 210 seen in Fig. 8, and the end 308a of the counterbore 308 in the bottom of leaf 280 will overlie the port 222 in the upper face of leaf 210, and the end 308b of counterbore 308 will overlie the port 220 in the upper face of leaf 210. The outer corner 308c of counterbore 308 will overlie the central vacuum-filled port 270 in leaf 210, and consequently vacuum will be applied to the ports 220 and 222 and thence to the left front bellows 20 and right front bellows 22. At the same time, the clockwise rotation of the stall leaf 280 will uncover the ports 216 and 218 and these ports as well as the left rear bellows 24 and right rear bellows 26 which are connected thereto will be vented to the atmosphere. The resultant contraction of the two front bellows and expansion of the two rear bellows will produce a rapid nosing down of the fuselage 10, thus simulating the stalling of a plane in actual flight.

*Trim action.*—Assuming that the fuselage 10 is in straight and level flight, the leaves 510 and 514 of valve 51 will be neutrally positioned with respect to one another and a slight vacuum leak will pass equally from the channels 598 and 600 in leaf 514 of valve 51 through the ports 588, 590, 592 and 594 in leaf 510 and through the ports 560, 562, 564 and 566 in leaf 512 and along the four pneumatic lines connecting leaf 512 with the four main bellows. Assuming that the student in the trainer then presses the control stick 40 ahead to lower the nose of the fuselage, and then the control stick 40 is released, through the previously described control stick spring centering means 485a of Fig. 6, the control stick 40 will be returned to its neutral position so that the valve cap 310 is centered with respect to the ports in the stall leaf 280. The lowering of the nose of the fuselage will produce an upward movement of the link 546 which connects with the leaf 514 of valve 51, and leaf 514 will be rotated counterclockwise of its neutral position. The vacuum channel 598 will then overlie the port 592 in leaf 510 and vacuum channel 600 will overlie the port 590. Vacuum will be applied from ports 590 and 592 through ports 564 and 562 to the two rear bellows. Simultaneously, the atmosphere port 602 will be moved into an overlying position with respect to port 588 and the atmosphere port 603 will be moved into an overlying position with respect to port 594. Atmosphere will pass through ports 588 and 594 in leaf 510 and thence through ports 560 and 566 to the two front bellows. The admission of vacuum to the rear bellows and atmosphere to the front bellows will result in a gradual raising of the nose of fuselage 10, and this raising will continue until the fuselage has been returned to its previous flight position, at which time the leaf 514 will again be centered with respect to leaf 510, and the raising of the nose of the fuselage will stop.

On the other hand, assuming that the student in the trainer pulls the control stick 40 to the rear of its neutral position to place the fuselage in a climbing attitude, and then releases the control stick, the previously described control stick centering means will return the stick to its neutral position and will return the cap 310 to its neutral position with respect to the ports in the stall leaf 280. The raising of the nose of the fuselage will result in a clockwise rotation of the leaf 514 from its neutral position, and vacuum will pass from the channels 598 and 600 in leaf 514 through the ports 594 and 588 in leaf 510 and thence through the ports 560 and 566 and the intermediate connecting pneumatic lines to the two front bellows. Simultaneously, the atmosphere ports 604 and 606 in leaf 514 will be placed into overlapping position with respect to the ports 590 and 592 in leaf 510, and atmosphere will be admitted through the ports 590 and 592 and ports 562 and 564 in leaf 512, as well as through the intermediate connecting pneumatic lines to the two rear bellows. The admission of vacuum to the forward bellows and of atmosphere to the rear bellows will result in a gradual lowering of the nose of fuselage 10, and this lowering will continue until the fuselage has been returned to its previous position, at which time the leaves 514 and 510 will be centered with respect to one another.

Consequently, the provision of the trim valve of this invention provides means whereby a forward or rearward movement of the control stick to change the pitch attitude of the fuselage and a subsequent releasing of the control stick results in a gradual returning of the fuselage 10 to its previous flight attitude, thus simulating the corresponding characteristic of a real plane in actual flight.

Assuming that the fuselage 10 is in a simulated trimmed flight position, and the throttle lever 500 is moved ahead to simulate the opening of the throttle of a real plane, the link 506 moves downwardly and leaf 510 is rotated clockwise of its neutral position. The clockwise rotation of leaf 510 will result in an application of increased vacuum to the ports 590 and 592 from the channels 598 and 600 in leaf 514, and this increased vacuum will be applied to the two rear bellows through the previously described connections. Simultaneously, atmosphere will be applied to the ports 588 and 594 in leaf 510 through the ports 602 and 608 in leaf 514, and atmosphere will be applied through the previously described paths to the two front bellows. The application of vacuum to the two rear bellows and of atmosphere to the two front bellows results in a gradual raising of the nose of the fuselage. As the nose of the fuselage raises, the link 546 which is connected to the movable leaf 514 of valve 51 will be moved downwardly and leaf 514 will be rotated clockwise as the nose of the fuselage 10 is raised. The nose of the fuselage will continue to rise until the leaf 514 has been rotated clockwise in response to the raising of the nose of the fuselage through the same angle as leaf 510 was rotated in response to the forward movement of the simulated throttle lever 500. At that time, the two leaves 510 and 514 will be centered with respect to one another, and the raising of the nose of the fuselage will stop.

On the other hand, when the student in the trainer moves the simulated throttle control lever 500 to the rear to simulate the closing of the throttle in the plane represented by the trainer, the link 506 is moved upwardly rotating the center leaf 510 of valve 51 counterclockwise. An application of increased vacuum to the front bellows and of atmosphere to the rear bellows will result, and the nose of the fuselage 10 will gradually be lowered. The lowering of the nose of the fuselage will result in an upward movement of link 546 and in a counterclockwise rotation of leaf 514, and the raising of the nose of the fuselage will continue until leaf 514 has been rotated counterclockwise through the same angle in response to the raising of the nose of the fuselage as the center leaf 510 was rotated in response to the retarding of the simulated throttle lever 500. At that time the two leaves 510 and 514 will be centered with respect to one another, and the fuselage motion will cease.

Consequently, this invention also includes means whereby the pitch attitude of the fuselage is responsive to the setting of the simulated throttle control lever, thereby simulating the characteristic of a real plane wherein the attitude of the plane is responsive to the setting of the throttle control lever.

When the simulated elevator trim control lever 544 is moved ahead, to simulate the setting of the elevator trim control lever in a real plane to produce a more nose-down flight attitude, the pivot 542 of bellcrank 530 is moved downwardly resulting in a downward movement of link 546 and in a clockwise rotation of the movable leaf 514 of the trim valve 51. The clockwise rotation of leaf 514 will result in an application of increased vacuum to the two front bellows and of atmosphere to the two rear bellows, and the nose of the trainer will gradually move downwardly. As the nose of the trainer moves downwardly the link 532 will rotate the bellcrank 539 counterclockwise about the pivot 540 until the leaf 514 has been returned to its previous position, at which time the nosing down of fuselage 10 will cease. The nose of fuselage 10 will then be lower and remain lower than the previous position thereof by an amount dependent upon the forward movement of simulated trim lever 544.

On the other hand, when the simulated trim control lever 544 is moved to the rear of a given position, the link 546 is moved upwardly and rotates the leaf 514 of valve 51 counterclockwise resulting in an application of vacuum to the two rear bellows and of atmosphere to the two forward bellows. The nose of the fuselage gradually is raised, and raising of the nose of the fuselage will result in a clockwise rotation of the leaf 514, and the gradual raising of the nose of the fuselage will continue until leaf 514 has been returned to its previous position. The nose of the fuselage will be higher and will remain higher than its previous flight attitude by an amount dependent upon the movement of the trim lever 544.

The provision of the simulated elevator trimming control 544 and the apparatus associated therewith provides means whereby the operational effects of the elevator trimming control of a real plane may be simulated.

It has been previously explained that the supply of vacuum to the trim valve 51 is dependent upon the bank attitude of the fuselage 10, and that as the banking of the fuselage is increased the supply of vacuum to this valve is gradually decreased and when the fuselage 10 is in its extreme banking position no vacuum is admitted to the trim valve 51. Consequently, the previously described movements of the fuselage controlled by the trim valve 51 are gradually eliminated by a banking of the fuselage. The gradual elimination of the effects of the trim valve 51 by a banking of the fuselage simulates the flight characteristics of a real plane wherein the inherent stability of a plane about its transverse axis gradually decreases with a banking of the plane, and wherein the pitch attitude of the plane becomes less responsive to the position of the throttle control lever as the plane is banked, and wherein the elevator trimming means of the plane gradually lose their effect as the plane is banked.

In view of the preceding disclosure, it will be appreciated that this invention discloses a novel main and auxiliary valve arrangement for use in conjunction with grounded aviation trainers of the type universally mounted upon a stationary base and having pneumatic means for pitching, banking and rotating the fuselage.

It will be appreciated that many changes may be made from the disclosed embodiment of this invention, without departing from the substance thereof as set forth in the following claims.

We claim:

1. In a grounded aviation trainer of the type comprising a fuselage universally mounted with respect to a stationary base and four expansible-contractible bellows connected to the fuselage for pivoting the same upon the universal joint, a first valve section comprising a flat surface, a central opening and four additional ports in said flat surface symmetrically spaced about said central opening, a pneumatic connection between each of said four ports and a different one of said bellows and a source of reduced pressure connected to said central opening, a second valve section having a flat surface arranged to lie against the flat surface of said first valve section, five ports in said second valve section each arranged to respectively overlie a different one of the five openings in said first valve section when said second valve section occupies a first predetermined position relative to said first valve section, a channel in the flat surface of said second valve section arranged to connect the central opening of said first valve section with two of the other ports in the same section when said second valve section occupies a second predetermined position, said second valve section being shaped and arranged to vent the other two ports in the first valve section to the atmosphere when the second valve section is in the second predetermined position, a plate arranged to substantially cover the said four ports in said second valve section when the plate is neutrally positioned, a chamber formed in said plate and arranged to overlie the central port in said second valve section, a manually movable member connected to said plate for moving said plate relative to the ports in said second valve section, where vacuum is selectively applied to the ports in said second valve and the ports therein are selectively vented to the atmosphere when the second valve section is in the first mentioned predetermined position, and means for positioning said second valve section in either of said predetermined positions.

2. The structure set forth in claim 1 in which the means for positioning the second valve section comprises a unit responsive to changes in the assumed air speed of the trainer, and the said unit is connected to the valve section to position the same in the first predetermined position when assumed air speed is above a predetermined amount and in the second predetermined position when assumed air speed is below the predetermined amount.

3. In a grounded aviation trainer of the type comprising a fuselage universally and rotatably mounted with respect to a stationary base and four expansible-contractible bellows connected to said fuselage for pivoting the same upon the universal joint as well as a pair of turning motors for rotating the fuselage with respect to the stationary base, a valve section comprising a flat surface, six ports symmetrically arranged in said surface, a pneumatic connection between each of four of said ports and a different one of said bellows and a pneumatic connection between each of said two other ports and a different one of said two turning motors, a plate arranged to substantially cover all of said ports when the plate is neutrally positioned, a vacuum chamber formed in the center of said plate, a manually controllable member, and a connection between said manually controllable member and a said plate arranged to move said plate in any direction radially of said flat surface dependent upon the direction of movement of said manually controllable member, whereupon said ports are selectively opened into said vacuum chamber and vented to the atmosphere to cause said fuselage to turn slightly in the opposite direction of a banking thereof.

4. In a grounded aviation trainer of the type having a fuselage universally mounted with respect to a stationary base and four expansible-contractible bellows for causing the fuselage to pitch and bank to simulate the pitching and banking of a plane in actual flight, the combination of a valve therein connected to said bellows to control the same, a lever in said fuselage simulating the throttle control lever of a real plane, means interconnecting said lever and said valve for operating said valve according to the position of said lever, a connection to said valve responsive to the pitching position of said fuselage for operating said valve according to the pitching position of said fuselage, and means responsive to the banking position of said fuselage for diminishing the control of said valve on the pitching position of said fuselage as the banking of said fuselage increases.

5. The structure set forth in claim 4 in which the valve comprises two movable leaves the relative positions of which partially control the said bellows, and the said simulated throttle control lever is connected to one of the leaves to move the same to change the pitch attitude of the fuselage in response to a movement of the lever, and the said connection responsive to the pitching position of the fuselage is connected to the other movable leaf and rotates the leaf as the pitch attitude of the fuselage changes in the same direction as the movement of the first leaf until the second leaf has been moved through the same angle as the first leaf.

6. The structure set forth in claim 5 in which a second lever simulating the elevator trim lever of a real plane is provided, the said lever being differentially connected to the second movable leaf with the connection responsive to the pitching position of the fuselage.

STANLEY I. HAYES.
THEODORE HERSKOVITS.

REFERENCES CITED

The following references are of record in the file of this patent:

UNITED STATES PATENTS

| Number | Name | Date |
|---|---|---|
| 2,099,857 | Link | Nov. 23, 1937 |
| 2,358,016 | Link | Sept. 12, 1944 |